US012180853B2

(12) United States Patent
Holley et al.

(10) Patent No.: US 12,180,853 B2
(45) Date of Patent: Dec. 31, 2024

(54) COMBINATION SEAL FOR A SUPERCRITICAL CARBON DIOXIDE TURBO GENERATOR

(71) Applicant: Hamilton Sundstrand Corporation, Charlotte, NC (US)

(72) Inventors: Brian M. Holley, Eastford, CT (US); Malcolm MacDonald, Bloomfield, CT (US); Duane C. McCormick, Colchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/364,302

(22) Filed: Aug. 2, 2023

(65) Prior Publication Data

US 2024/0018880 A1 Jan. 18, 2024

Related U.S. Application Data

(62) Division of application No. 17/130,957, filed on Dec. 22, 2020, now Pat. No. 11,725,536.

(51) Int. Cl.
*F01D 25/12* (2006.01)
*F01D 11/02* (2006.01)
(Continued)

(52) U.S. Cl.
CPC .............. *F01D 25/12* (2013.01); *F01D 11/02* (2013.01); *F01D 15/10* (2013.01); *F01D 25/125* (2013.01);
(Continued)

(58) Field of Classification Search
CPC ........ F01D 25/12; F01D 25/125; F01D 15/10; F01D 11/02; F01D 11/025; F01K 25/103;
(Continued)

(56) References Cited

U.S. PATENT DOCUMENTS 8,397,506 B1 * 3/2013 Wright ...................... F02C 1/10 415/110
10,161,259 B2 12/2018 Gibson et al.
(Continued)

FOREIGN PATENT DOCUMENTS

CN 205823447 U 12/2016
CN 107448246 A 12/2017
(Continued)

OTHER PUBLICATIONS

Cho et al. "Development of the turbomachinery for the supercritical carbon dioxide power cycle" International Journal of Energy Research 40.5 (Apr. 2016): pp. 587-599.
Search Report issued in European Application No. 21216366.1; Application Filing Date Dec. 21, 2021; Date of Mailing May 19, 2022 (5 pages).

*Primary Examiner* — Mark A Laurenzi
*Assistant Examiner* — Xiaoting Hu
(74) *Attorney, Agent, or Firm* — CANTOR COLBURN LLP

(57) ABSTRACT

A turbo generator rotor assembly is provided and includes a generator, first and second bearings on a compressor-side and a turbine-side of the generator and a combination seal configuration in which leakage from the compressor cools the first bearing, the generator and the second bearing. The combination seal configuration leads to minimal leakage past the turbine with the generator and the first and second bearings being cooled with leakage flow from the compressor.

6 Claims, 4 Drawing Sheets

(51) Int. Cl.
*F01D 15/10* (2006.01)
*F01K 7/32* (2006.01)
*F01K 25/10* (2006.01)

(52) U.S. Cl.
CPC .............. *F01K 25/103* (2013.01); *F01K 7/32* (2013.01); *F05D 2220/76* (2013.01); *F05D 2240/55* (2013.01); *F05D 2260/20* (2013.01)

(58) Field of Classification Search
CPC .. F01K 7/32; F05D 2260/20; F05D 2260/205; F05D 2260/232; F05D 2260/234; F05D 2260/6022; F05D 2240/50; F05D 2240/55; F05D 2220/76
See application file for complete search history.

(56) References Cited

U.S. PATENT DOCUMENTS

| | | | | |
|---|---|---|---|---|
| 10,208,609 | B2 | 2/2019 | Kalra et al. | |
| 11,225,905 | B1 * | 1/2022 | Holley .................... | F01K 23/02 |
| 2002/0110450 | A1 | 8/2002 | Swinton | |

FOREIGN PATENT DOCUMENTS

| | | | |
|---|---|---|---|
| CN | 108625917 | A | 10/2018 |
| CN | 110725955 | A | 1/2020 |
| CN | 111577399 | A | 8/2020 |
| EP | 3492705 | A1 | 6/2019 |
| KR | 101327266 | B1 | 11/2013 |

* cited by examiner

COMBINATION SEAL FOR A SUPERCRITICAL CARBON DIOXIDE TURBO GENERATOR

CROSS-REFERENCE TO RELATED APPLICATIONS

This application is a division of U.S. application Ser. No. 17/130,957 filed Dec. 22, 2020, the disclosure of which is incorporated herein by reference in its entirety.

BACKGROUND

The present disclosure relates to generators and, in particular, to a combination seal for a supercritical carbon dioxide turbo generator.

Supercritical carbon dioxide (sCO2) turbo generator efficiency depends on the ability to manage windage loss and cooling of the generator rotor and bearings. Windage loss is typically managed by pumping the cavity between the generator rotor and the stator to a pressure well below the pressures of the sCO2 cycle. Seals between the generator and each turbomachinery rotor reduce the parasitic loss associated with pumping out the generator cavity. In general, extractable power can be increased by pumping out the generator rotor cavity and with better sealing. Some leakage, however, is needed for cooling the bearings and for the generator rotor to maintain its efficiency. Parasitic pumping loss and generator efficiency can be balanced for efficiency gain.

BRIEF DESCRIPTION

According to an aspect of the disclosure, a turbo generator rotor assembly is provided and includes a generator, first and second bearings on a compressor-side and a turbine-side of the generator and a combination seal configuration in which leakage from the compressor cools the first bearing, the generator and the second bearing.

In accordance with additional or alternative embodiments, the combination seal configuration includes a controlled-leakage seal axially interposed between a compressor and the first bearing and a low-leakage seal axially interposed between the second bearing and a turbine.

In accordance with additional or alternative embodiments, the controlled-leakage seal includes a labyrinth seal.

In accordance with additional or alternative embodiments, the low-leakage seal includes a film riding face seal.

In accordance with additional or alternative embodiments, the controlled-leakage seal includes a labyrinth seal and the low-leakage seal includes a film riding face seal.

In accordance with additional or alternative embodiments, the combination seal configuration is configured such that at least a portion of the leakage from the compressor flows through the first bearing, around the generator and through the second bearing and is redirected as egress from the second bearing to a pump.

In accordance with additional or alternative embodiments, the combination seal configuration is further configured such that leakage from a turbine is redirected as egress from the second bearing to the pump.

In accordance with additional or alternative embodiments, a flow rate of the leakage from the compressor is adjustable According to an aspect of the disclosure, a super-critical carbon dioxide ($sCO_2$) turbo generator rotor assembly with a generator operably interposed between a compressor and a turbine is provided. The turbo generator rotor assembly includes a first bearing interposed between the compressor and the generator, a second bearing interposed between the generator and the turbine, a controlled-leakage seal interposed between the compressor and the first bearing and a low-leakage seal interposed between the second bearing and the turbine.

In accordance with additional or alternative embodiments, the generator is axially interposed between the compressor and the turbine, the first and second bearing are axially interposed between the compressor and the generator and between the generator and the turbine, respectively, and the controlled-leakage and low-leakage seals are axially interposed between the compressor and the first bearing and between the second bearing and the turbine, respectively.

In accordance with additional or alternative embodiments, the controlled-leakage seal includes a labyrinth seal.

In accordance with additional or alternative embodiments, the low-leakage seal includes a film riding face seal.

In accordance with additional or alternative embodiments, the controlled-leakage seal includes a labyrinth seal and the low-leakage seal includes a film riding face seal.

In accordance with additional or alternative embodiments, at least a portion of the leakage from the compressor flows through the controlled-leakage seal, through the first bearing, around the generator and through the second bearing and is redirected as egress from the second bearing to a pump by the low-leakage seal.

In accordance with additional or alternative embodiments, leakage from the turbine is redirected as egress from the second bearing to the pump by the low-leakage seal.

In accordance with additional or alternative embodiments, the first bearing, the generator and the second bearing are cooled by the leakage from the compressor.

In accordance with additional or alternative embodiments, a flow rate of the leakage from the compressor is adjustable.

According to an aspect of the disclosure, a method of operating a super-critical carbon dioxide ($sCO_2$) turbo generator rotor assembly with a generator operably interposed between a compressor and a turbine is provided. The method includes directing leakage from the compressor through a first bearing on a compressor-side of the generator, around the generator and through a second bearing on a turbine-side of the generator and redirecting the leakage from the compressor and leakage from a turbine as egress from the second bearing to a pump. The directing of the leakage from the compressor includes determining an operating condition of the $sCO_2$ turbo generator rotor assembly and adjusting the leakage from the compressor to achieve a balance of generator efficiency and a parasitic pumping loss for the operating condition.

In accordance with additional or alternative embodiments, the adjusting of the leakage from the compressor includes increasing a flow rate of the leakage from the compressor to increase the generator efficiency and decreasing the flow rate of the leakage from the compressor to reduce the parasitic pumping loss.

In accordance with additional or alternative embodiments, the adjusting of the leakage from the compressor further includes controlling the flow rate of the leakage from the compressor based on a power condition Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, a combination of seals is provided for use on the compressor and turbine sides of the generator. A seal with comparatively little leakage, such as a film riding face seal, is used on the turbine side of the generator. A seal with more leakage, such as a labyrinth seal, is used on the generator side. The configuration leads to minimal leakage past the turbine so that the generator and bearings are cooled with leakage flow from the lower temperature compressor. The seal on the compressor side is designed such that it meets the bearing and generator cooling requirements. The compressor side seal may be configured such that the leakage can be regulated, increased or decreased depending on the cooling required.

Figure 1:
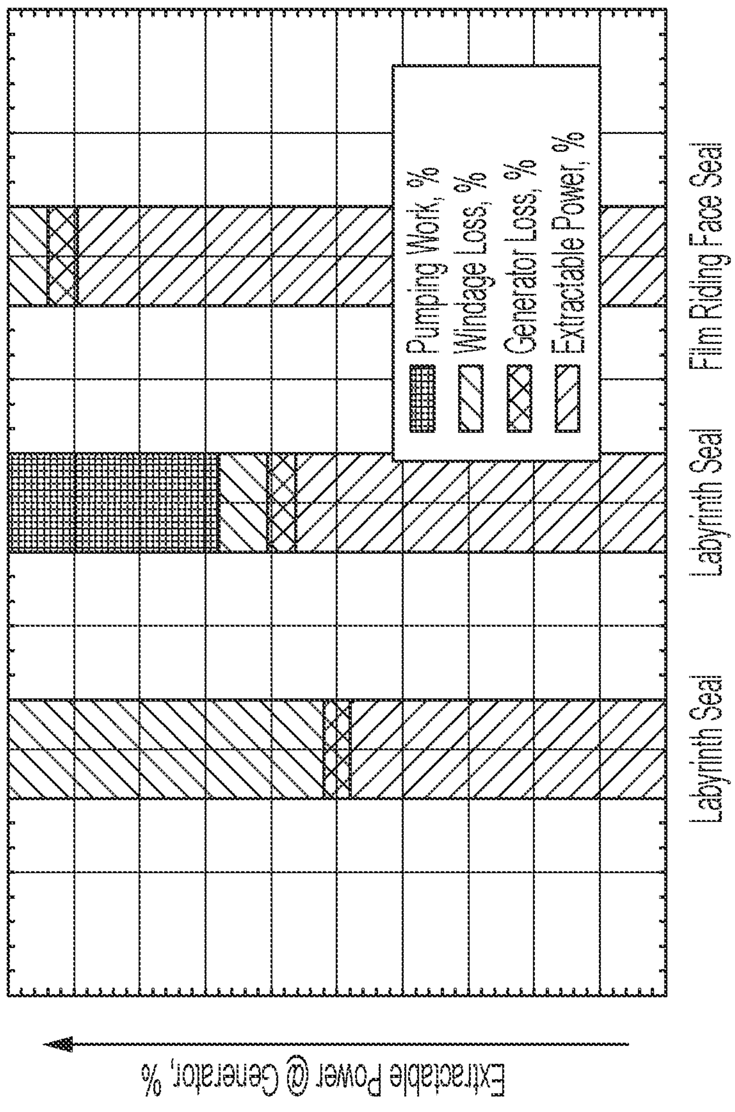
FIG. 1 is a graphical depiction of extractable power for various seal configurations in accordance with embodiments.

With reference to FIG. 1, supercritical carbon dioxide ($sCO_2$) turbo generator efficiency depends on an ability to manage windage loss and cooling of the generator rotor and bearings. Windage loss is typically managed by pumping the cavity between generator rotor and stator to a pressure well below the pressures of the sCO2 cycle. Seals between the generator and each turbomachinery rotor reduce the parasitic loss associated with pumping out the generator cavity.

FIG. 1 illustrates how extractable power can be increased by pumping out the generator rotor cavity and with better sealing. Some leakage, however, is needed for cooling the bearings and for the generator rotor to maintain its efficiency. Parasitic pumping loss and generator efficiency can be balanced for efficiency gain. FIG. 1 shows that an amount of power that can be extracted from a $sCO_2$ cycle can be increased if some (i.e., possibly very little) parasitic pumping loss is incurred to decreased windage loss and that extractable power can also be increased with better sealing (i.e., as in a case in which a film riding face seal is compared with a labyrinth seal).

Figure 2:
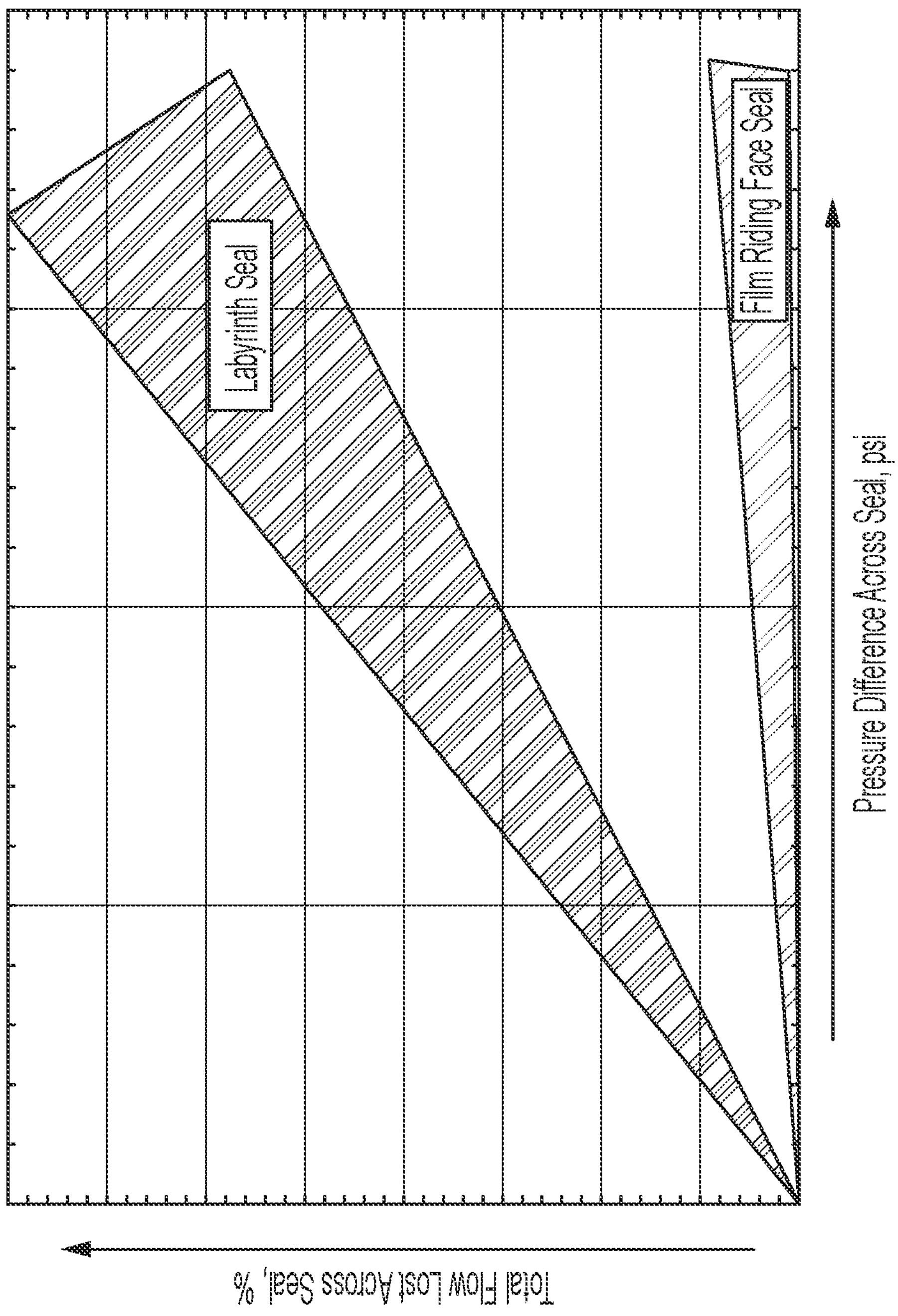
FIG. 2 is a graphical depiction of total flow loss across a seal vs. pressure differential across seal in accordance with embodiments.

With reference to FIG. 2, seals have different seal characteristics. For example, low-leakage seal, such as a film riding face seal provides for relatively little leakage with increasing pressure differential across the low-leakage seal, whereas a controlled-leakage seal, such as a labyrinth seal, allows for a controlled amount of leakage with increasing pressure differential across the controlled-leakage seal.

Figure 3:
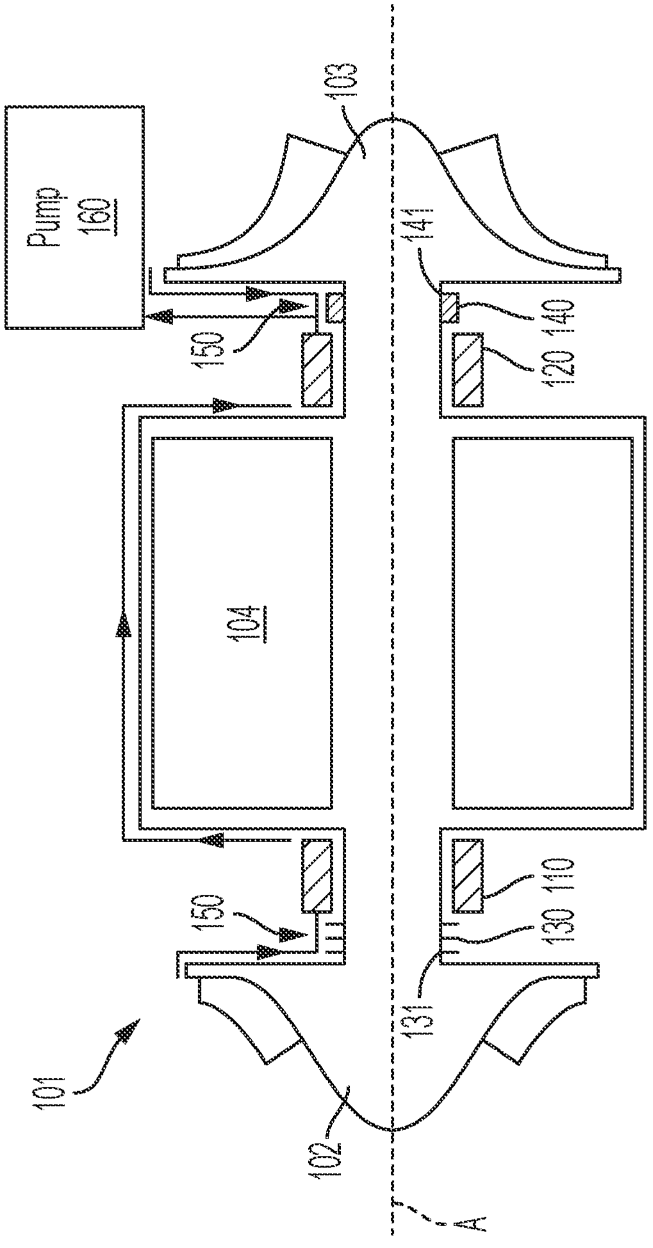
FIG. 3 is a side schematic view of a turbo generator rotor assembly in accordance with embodiments.

With reference to FIG. 3, a turbo generator rotor assembly 101 is provided and may be configured as an $sCO_2$ turbo generator rotor assembly. As shown in FIG. 3, the turbo generator rotor assembly 101 includes a compressor 102, a turbine 103 and a generator 104 that is operably and axially interposed between the compressor 102 and the turbine 103. The turbo generator rotor assembly 101 further includes a first bearing 110, a second bearing 120, a controlled-leakage seal 130 and a low-leakage seal 140. The first bearing 110 and the second bearing 120 are configured to support rotation of the generator 104 about the rotational axis A. The first bearing 110 is axially interposed between the compressor 102 and the generator 104. The second bearing 120 is axially interposed between the generator 104 and the turbine 103. The controlled-leakage seal 130 and the low-leakage seal 140 cooperatively form a combination seal configuration 150 in which leakage from the compressor 102 is directed such that the leakage from the compressor 102 cools the first bearing 110, the generator 104 and the second bearing 120. The controlled-leakage seal 130 can include or be provided as a labyrinth seal 131 and is axially interposed between the compressor 102 and the first bearing 110. The low-leakage seal 140 can include or be provided as a film riding face seal 141 and is axially interposed between the second bearing 120 and the turbine 103.

During operations of the turbo generator rotor assembly 101, at least a portion of the leakage from the compressor 102 flows through the controlled-leakage seal 130, through the first bearing 110, around an exterior of the generator 104 and through the second bearing 120. The leakage from the compressor 102 is then redirected as egress from the second bearing 120 to a pump 160 by the low-leakage seal 140. Leakage from the turbine 103 is redirected as egress from the second bearing 120 to the pump 160 by the low-leakage seal 140. In this way, the first bearing 110, the generator 104 and the second bearing 120 are cooled by the leakage from the compressor 102. Moreover, as will be discussed below, a flow rate of the leakage from the compressor 102 is adjustable at least at one or more of the compressor 102 and the controlled-leakage seal 130 in accordance with certain current conditions and power availability.

To the extent that at least a portion of the leakage is ultimately directed toward the pump 160, it is to be understood that mass-balancing and other similar functionality can be used to avoid over-filling a loop of the pump 160 or other similar effects.

Figure 4:
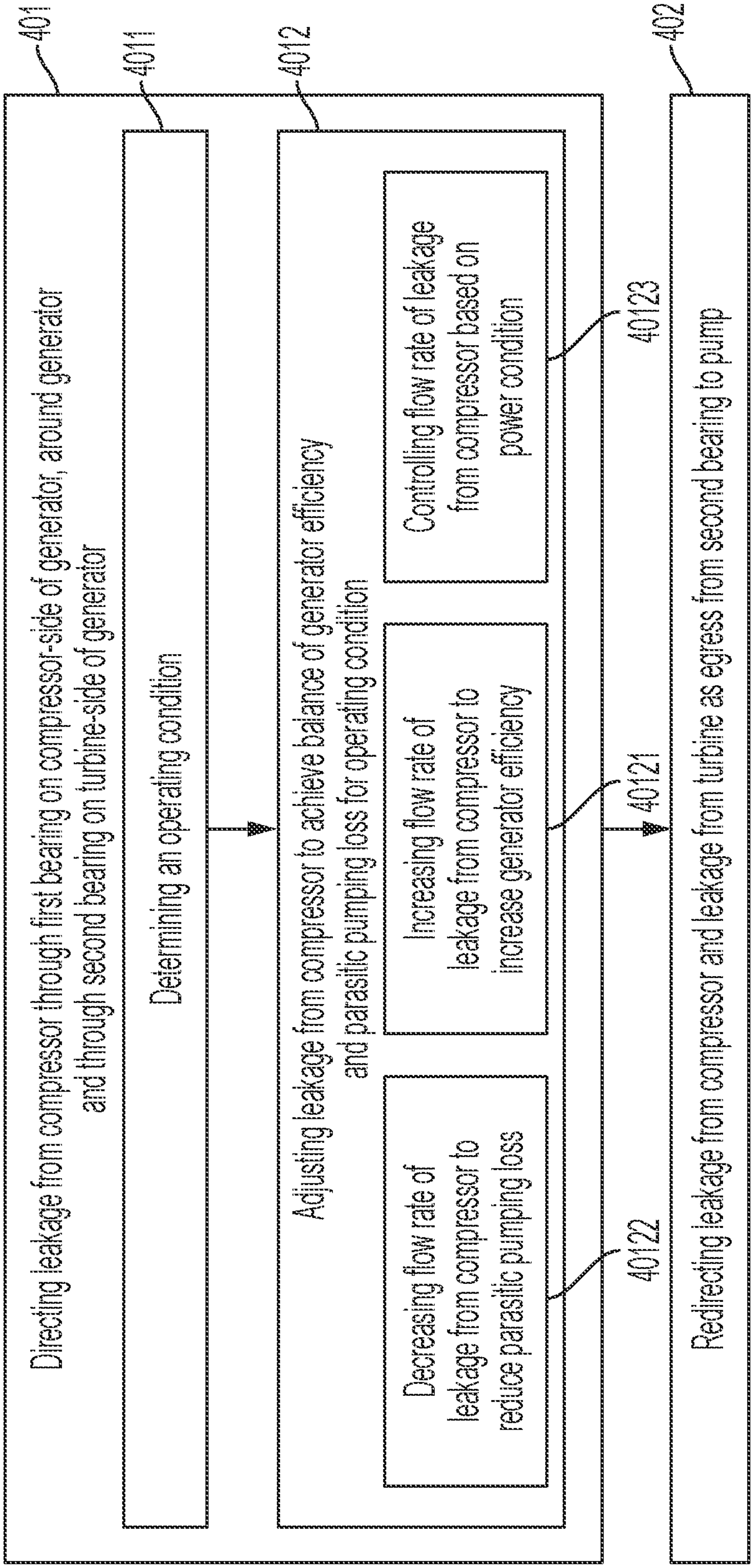
FIG. 4 is a flow diagram illustrating a method of operating a turbo generator rotor assembly in accordance with embodiments.

With continued reference to FIG. 3 and with additional reference to FIG. 4, a method of operating an $sCO_2$ turbo generator rotor assembly, such as the turbo generator rotor assembly 101 of FIG. 3, is provided. The method includes directing at least a portion of the leakage from the compressor 102 through the first bearing 110 on a compressor-side of the generator 104, around the generator 104 and through the second bearing 120 on a turbine-side of the generator (401) and redirecting at least the portion of the leakage from the compressor 102 and at least a portion of the leakage from the turbine 103 as egress from the second bearing 120 to the pump 160 (402). The directing of at least the portion of the leakage from the compressor 102 of operation 401 includes determining an operating condition of the $sCO_2$ turbo generator rotor assembly (4011) and adjusting the leakage from the compressor 102 to achieve a balance of generator efficiency and a parasitic pumping loss for the operating condition (4012). The adjusting of the leakage from the compressor 102 of operation 4012 can include at least one or both of increasing a flow rate of the leakage from the compressor 102 to increase the efficiency of the generator 104 (40121) and decreasing the flow rate of the leakage from the compressor 102 to reduce the parasitic pumping loss of the pump 160 (40122). The adjusting of the leakage from the compressor 102 of operation 4102 can further include controlling the flow rate of the leakage from the compressor 102 based on a power condition (40123). The adjusting of the leakage from the compressor 102 of operation 4102 can occur at least at one or more of the compressor 102 and the controlled-leakage seal 130.

Technical effects and benefits of the present disclosure are reduced parasitic loss and increased generator efficiency. The source of bearing and generator coolant is from the compressor side of the turbo generator rotor and the bearing and generator coolant is subsequently cooler. As such, the generator can be operated at a lower temperature for increased power conversion efficiency. The cooling flow rate may also be reduced, thereby reducing the parasitic pumping requirement. In cases where the compressor-side seal leakage is controlled, the leakage may be adjusted based on the power condition. The leakage may be adjusted for an optimum balance of generator efficiency and parasitic pumping loss for each operating condition.

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A method of operating a super-critical carbon dioxide ($sCO_2$) turbo generator rotor assembly with a generator operably interposed between a compressor and a turbine, the method comprising:

directing leakage from the compressor through a first bearing on a compressor-side of the generator, around the generator and through a second bearing on a turbine-side of the generator; and redirecting the leakage from the compressor and leakage from a turbine as egress from the second bearing to a pump, wherein the directing of the leakage from the compressor comprises:

determining an operating condition of the $sCO_2$ turbo generator rotor assembly; and adjusting the leakage from the compressor to achieve a balance of generator efficiency and a parasitic pumping loss for the operating condition.

2. The method according to claim 1, wherein the adjusting of the leakage from the compressor comprises:

increasing a flow rate of the leakage from the compressor to increase the generator efficiency; and decreasing the flow rate of the leakage from the compressor to reduce the parasitic pumping loss.

3. The method according to claim 2, wherein the adjusting of the leakage from the compressor further comprises controlling the flow rate of the leakage from the compressor based on a power condition.

4. A method of operating a super-critical carbon dioxide ($sCO_2$) turbo generator rotor assembly with a generator operably interposed between a compressor and a turbine, the method comprising:

directing leakage from the compressor through a first bearing on a compressor-side of the generator, around an exterior of the generator and through a second bearing on a turbine-side of the generator; and redirecting the leakage from the compressor and leakage from a turbine as egress from the second bearing to a pump, wherein the directing of the leakage from the compressor comprises:

determining an operating condition of the $sCO_2$ turbo generator rotor assembly; and adjusting the leakage from the compressor to achieve a balance of generator efficiency and a parasitic pumping loss for the operating condition.

5. The method according to claim 4, wherein the adjusting of the leakage from the compressor comprises:

increasing a flow rate of the leakage from the compressor to increase the generator efficiency; and decreasing the flow rate of the leakage from the compressor to reduce the parasitic pumping loss.

6. The method according to claim 5, wherein the adjusting of the leakage from the compressor further comprises controlling the flow rate of the leakage from the compressor based on a power condition.

* * * * *